United States Patent [19]

Von Hayn et al.

[11] Patent Number: 4,826,256
[45] Date of Patent: May 2, 1989

[54] BRAKE SLIP-CONTROLLED HYDRAULIC BRAKE SYSTEM FOR VEHICLES

[75] Inventors: Holger Von Hayn, Frankfurt am Main; Joachim Maas, Darmstadt, both of Fed. Rep. of Germany

[73] Assignee: Alfred Teves GmbH, Frankfurt am Main, Fed. Rep. of Germany

[21] Appl. No.: 115,667

[22] Filed: Nov. 2, 1987

[30] Foreign Application Priority Data

Nov. 11, 1986 [DE] Fed. Rep. of Germany ....... 3638375

[51] Int. Cl.⁴ ............... B60T 15/58; B60T 13/68; B60T 8/42
[52] U.S. Cl. .................................... 303/61; 303/115; 303/119; 60/544
[58] Field of Search .............. 303/3, 10, 61, 62, 68, 303/110, 113, 114, 115, 116, 119; 188/181 A; 60/544, 591

[56] References Cited

U.S. PATENT DOCUMENTS

| | | | |
|---|---|---|---|
| 3,495,880 | 2/1970 | Gratsch | 303/61 X |
| 3,698,772 | 10/1972 | Nixon | 303/61 X |
| 3,877,759 | 4/1975 | Sekiguchi et al. | 303/115 |
| 3,989,125 | 11/1976 | Holst | 303/61 |
| 4,025,124 | 5/1977 | Fuchs | 303/116 X |
| 4,068,904 | 1/1978 | Blomberg et al. | 303/115 |
| 4,099,793 | 7/1978 | Iio | 303/116 |
| 4,536,041 | 8/1985 | Kosolapov et al. | 303/116 X |

FOREIGN PATENT DOCUMENTS

| | | | |
|---|---|---|---|
| 0908070 | 3/1972 | Canada | 303/116 |
| 0152344 | 7/1985 | European Pat. Off. | 303/119 |
| 7341671 | 12/1974 | Fed. Rep. of Germany . | |
| 3134155 | 4/1982 | Fed. Rep. of Germany . | |
| 0872344 | 10/1981 | U.S.S.R. | 303/115 |
| 1382856 | 2/1975 | United Kingdom . | |
| 2145487 | 3/1985 | United Kingdom . | |
| 2174775 | 11/1986 | United Kingdom . | |

*Primary Examiner*—Andres Kashnikow
*Assistant Examiner*—Timothy Newholm
*Attorney, Agent, or Firm*—James B. Raden

[57] ABSTRACT

Disclosed is a brake system wherein the wheel brake is hydraulically connected with a relief chamber of periodically variable volume. A valve 11 controlled by control electronics is switched to connect the chamber to either the wheel brake or a reservoir synchronously to the direction of movement of a piston in the relief chamber to either increase or decrease pressure at the brake for the purpose of antilock and slip control of the brake.

7 Claims, 1 Drawing Sheet

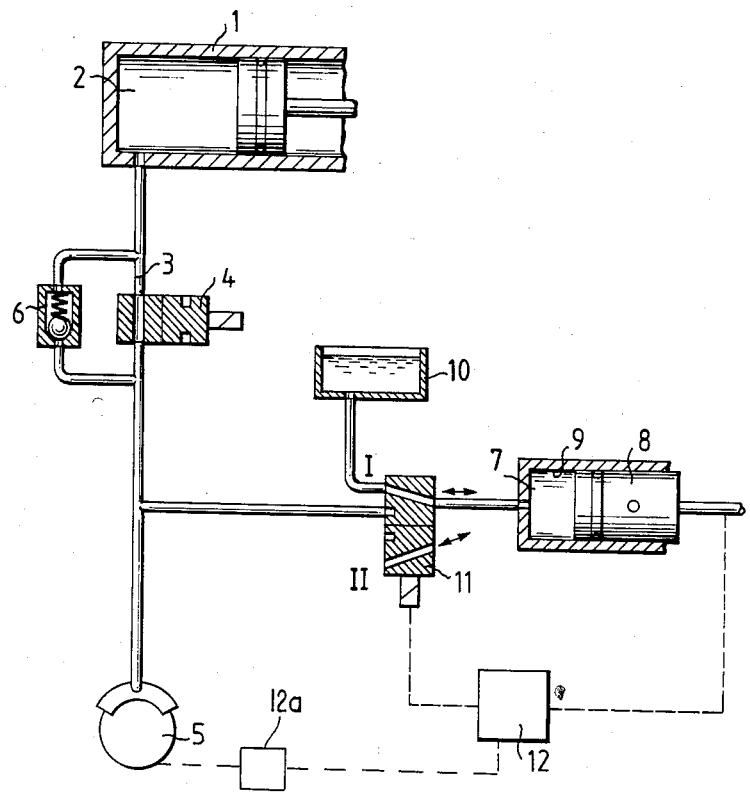

BRAKE SLIP-CONTROLLED HYDRAULIC BRAKE SYSTEM FOR VEHICLES

BACKGROUND OF THE INVENTION

The present invention relates to a brake slip-controlled hydraulic brake system for vehicles of the type including a brake master cylinder and at least one wheel brake which is connected to the brake master cylinder and a slip control device which senses wheel rotational behavior by means of a sensor and which, in response to the sensor signal, pursuant a defined algorithm, disconnects the hydraulic connection between the wheel brake and the master cylinder and/or establishes a hydraulic connection to a relief chamber.

A brake system of this type is described in U.S. application Ser. No. 944,242, now U.S. Pat. No. 4,750,790 filed Dec. 18, 1986, and corresponding to German printed patent application No. 35 45 236. A relief chamber in that system is confined by a floating piston guided in a cylinder, which piston, on the one hand, when pressure fluid enters from the brake, moves in opposition to the force of a weak spring for the purpose of increasing the relief chamber volume while, on the other hand, in the event that a pressure increase becomes necessary, the piston is displaced by a pneumatic drive for decreasing the relief chamber volume.

The control of the drive in this system is relatively complicated, since it must be ensured that, on the one hand, there is available sufficient drive power in the event that a pressure increase is required and, on the other hand, that the drive piston is retracted fast enough to enable sufficient pressure fluid relief to take place.

Also, the design of the cylinder incorporating the floating piston and the pneumatic drive in this system is structurally complex.

SUMMARY OF THE INVENTION

Therefore, it is an object of the present invention to provide for a considerably simplified cylinder and drive structure.

This object is achieved according to the invention in that the relief chamber has a periodically varying volume with the variation in volume being recorded by the slip control device. According to an important feature of the invention, the connection of the wheel brake to the relief chamber for the purpose of establishing pressure reduction in the wheel brake is done during a phase of relief chamber volume increase and for effecting a pressure increase during a phase of relief chamber volume decrease.

The relief chamber of periodically varying volume is achieved according to the invention in an advantageous manner with a piston which is sealed in and reciprocally moved in a bore which is closed on one side.

According to another feature of the invention, the connection between the relief chamber and the wheel brake is through a three-way/two-way position directional control valve which, in its initial position, connects the discharge chamber to an unpressurized supply reservoir, while, in a further position, connects the chamber to the wheel brake.

Since, in the event of slip control, the brake master cylinder must be uncoupled from the wheel brake, a two-way/two-position directional control valve is provided in the hydraulic connection between the working chamber of the brake master cylinder and the wheel brake. The valve either opens or closes the hydraulic connection depending on whether a slip condition exists at the wheel.

According to a still further important aspect of the invention, to enable the driver of the vehicle to reduce the braking pressure when slip control is performed, a non-return valve opening toward the brake master cylinder is connected in parallel to the two-way/two-position directional control valve.

Another feature of the invention provides for the three-way/two-position directional control valve to be actuated electromagnetically by a control unit in response to signals received by the control unit relating to the change of the relief chamber's volume.

Advantageously, the frequency of the volume variation is adapted to the control frequency required to attain a relatively constant slip of the wheel.

BRIEF DESCRIPTION OF THE DRAWING

The invention will be better understood after reading the following Detailed Description of the Preferred Embodiment in conjunction with the drawing the single figure of which is a partial cross sectional, schematic view of a portion of a brake system including the slip control device according to the invention.

DETAILED DESCRIPTION OF THE PREFERRED EMBODIMENT

In the drawing, reference numeral 1 designates a brake master cylinder having a working chamber 2 which is connected to a wheel brake 5 by a pressure line 3.

The pressure line 3 includes a two-way/two-position directional control valve 4, whose initial position opens the connection between the working chamber 2 and the wheel brake 5 and whose second position when the valve is actuated closes the connection.

Located in parallel to the valve 4 is a non-return valve 6 opening toward the working chamber 2.

Further, there is provided of a relief chamber 7 which is formed by a piston 8 sealingly guided in a bore 9 closed on one side. The piston is reciprocally moved back and forth by any well known drive such as, for example a non-illustrated crank drive.

By means of a three-way/two-way directional control valve 11, the chamber 7 can be connected to either a supply reservoir 10 or to the wheel brake 5. Position I of the valve corresponds to a connection with the unpressurized supply reservoir 10; position II corresponds to a connection with the wheel brake 5.

Valve 11 is actuated by a control electronics 12 which not only receives information on the wheel rotational behavior by way of a wheel sensor 12a, but also information on the direction of movement of the piston 8.

The operation of the slip control device is as follows:

Upon commencement of braking, the valve 4 is in its open initial position, and valve 11 is in the position I. When pressure is built up in the working chamber 2 of the brake master cylinder 1, the pressure is supplied to the wheel brake 5 and causes a corresponding wheel and vehicle deceleration.

When the wheel-rotation monitoring electronics indicates that the wheel tends to lock, first the valve 4 will be switched over so that, despite further pressure increase in the working chamber 2, the wheel 5 will not be decelerated any further.

Chamber 7 is connected with the unpressurized supply reservoir up to this point in time, so that movement of the piston 8 causes pressure fluid in an unpressurized state to move back and forth between the supply reservoir 10 and the chamber 7.

When the electronics for monitoring the rotational behavior of the wheel ascertains that pressure reduction is necessary to prevent locking of the wheel, the control electronics first determines in what direction the piston 8 is moving. In the case where the volume of the chamber 7 is increasing, valve 11 will be switched into position II. In case where the piston is moving in the opposite sense, the electronics will wait until the piston moves in the sense of volume increase, before valve 11 is switched over.

Due to the volume increase of chamber 7, the pressure fluid in the wheel brake can be relieved, with a corresponding pressure reduction and re-acceleration of the wheel resulting therefrom.

As soon as the wheel has been accelerated to a sufficient extent, the valve 11 will switch into the position I again and again connect chamber 7 to the supply reservoir 10.

Pressure build-up in the wheel brake which may become necessary is performed in a similar manner. The difference being that the change-over of valve 11 into the position II will be performed only in the presence of a decrease of the volume of chamber 7.

It can be appreciated that the control electronics 12 issues its switching signals to the valve 11 only in synchronization with the movement of the piston 8.

This structure provides for a considerably simplified hydraulic circuitry.

At first encounter, one might think that it is a disadvantage of this arrangement that pressure build-up in the wheel brake is not possible when the piston moves in the sense of increasing the volume of chamber 7 and that pressure decrease is not possible when the piston moves in the opposite sense. However, this disadvantage may be compensated for in that the frequency of the volume variation, that is the number of revolutions of the drive and frequency of the reciprocation of the piston, is conformed to the control frequency necessary for attaining optimal slip.

The non-return valve 6 enables the driver to release the brake also in the event of a brake slip control action. As soon as he takes his foot from the pedal and thus initiates pressure reduction in the working chamber 2, the non-return valve 6 will open, and corresponding pressure reduction takes place in the wheel brake 5. As a result, the wheel will reach a speed range which is below any tendency to lock so that now the control electronics causes valve 4 to switch to its opened position and valve 11 to switch to its position I.

Even though only one system for one wheel brake is described and shown, it is easily comprehensible that a relief chamber 7 and other system components described must be provided for each wheel whose rotational behavior is to be controlled.

What is claimed is:

1. A brake slip-control hydraulic brake system for vehicles, comprising a brake master cylinder and at least one wheel brake connected to the brake master cylinder, slip control means including a sensor which senses wheel rotational behavior, said slip control means being adapted to respond to the sensor signal and pursuant to a defined algorithm, operating a first electromagnetically actuated valve means to isolate the connection of the wheel brake to the master cylinder, said control means being further adapted to actuate a second electromagnetically actuated valve means to alternatively establish a hydraulic connection between a relief chamber and said wheel brake, or between said relief chamber and a reservoir, means for periodically varying the volume of said relief chamber, said volume variation being recorded by said control means, said control means establishing by way of said second valve means the connection of the wheel brake to the relief chamber for pressure reduction in the wheel brake during a phase of relief chamber volume increase and establishing by way of said second valve means the connection between the relief chamber and said wheel brake during a phase of relief chamber volume decrease to effect a pressure increase in the wheel brake.

2. The vehicle brake as claimed in claim 1 wherein the relief chamber is formed by a piston which is reciprocally and sealedly disposed in a bore closed on one side.

3. The brake slip control unit as claimed in claim 2 wherein the control of the second valve means is synchronized with the reciprocal movement of the piston.

4. The vehicle brake as claimed in claim 1 wherein said second valve means comprises a three-way/two-way directional control valve.

5. The brake slip control unit as claimed in claim 1 wherein the first valve means is a two-way/two position directional control valve and is provided in the connection between the brake master cylinder and the wheel brake, said first valve means adapted to either open or close a pressure line.

6. The brake slip control unit as claimed in claim 5 wherein a non-return valve opening toward the brake master cylinder is connected in parallel to the first means.

7. The brake slip control unit as claimed in claim 1 wherein the frequency of the periodic relief chamber volume variation conforms to a control frequency required to control the wheel rotational behavior.

* * * * *